US009665660B2

(12) United States Patent
Wensel

(10) Patent No.: US 9,665,660 B2
(45) Date of Patent: May 30, 2017

(54) LOGICAL DATA FLOW MAPPING RULES FOR (SUB) GRAPH ISOMORPHISM IN A CLUSTER COMPUTING ENVIRONMENT

(71) Applicant: Xplenty Ltd., Tel Aviv-Yafo (IL)

(72) Inventor: Chris K. Wensel, San Francisco, CA (US)

(73) Assignee: Xplenty Ltd., Tel Aviv-Yafo (IL)

( * ) Notice: Subject to any disclaimer, the term of this patent is extended or adjusted under 35 U.S.C. 154(b) by 235 days.

(21) Appl. No.: 14/659,267

(22) Filed: Mar. 16, 2015

(65) Prior Publication Data
US 2015/0261881 A1    Sep. 17, 2015

Related U.S. Application Data

(60) Provisional application No. 61/953,324, filed on Mar. 14, 2014.

(51) Int. Cl.
*G06F 17/30* (2006.01)
*G06F 9/44* (2006.01)

(52) U.S. Cl.
CPC ...... *G06F 17/30958* (2013.01); *G06F 9/4436* (2013.01); *G06F 17/30914* (2013.01)

(58) Field of Classification Search
CPC ......... G06F 17/30958; G06F 17/30914; G06F 9/4436
USPC ........................................... 707/798
See application file for complete search history.

(56) References Cited

U.S. PATENT DOCUMENTS

| 6,389,587 B1 * | 5/2002 | Lewis | G06F 8/34 717/104 |
| 7,243,351 B2 * | 7/2007 | Kundu | G06F 9/505 370/229 |
| 8,537,160 B2 * | 9/2013 | Hargrove | G06T 11/206 345/440 |
| 8,578,389 B1 * | 11/2013 | Boucher | G06F 9/4436 717/144 |
| 9,092,266 B2 * | 7/2015 | Boutin | G06F 9/5027 |
| 9,300,749 B2 * | 3/2016 | Guerin | G06F 15/167 |

(Continued)

FOREIGN PATENT DOCUMENTS

EP    1387297 A2    2/2004

OTHER PUBLICATIONS

Bosilca, George, et al., "DAGuE: A generic distributed DAG engine for High Performance Computing", Parallel Computing, vol. 38, Issues 1-2, Jan./Feb. 2012, pp. 37-51.*

(Continued)

*Primary Examiner* — Robert Stevens
(74) *Attorney, Agent, or Firm* — Graeser Associates International Inc; Dvorah Graeser

(57) ABSTRACT

A system and a method are disclosed for transforming cluster computing resources of a target system to match a user defined logical data flow so data processing between the source and target are functionally equivalent. The source logical dataflow is compatibly mapped to a target directed acyclic graph that represents the cluster computing resources. A series of subgraph assertion and transform operations are applied iteratively until the logical data flow is isomorphic with a directed acyclic graph. The assertion and transform operations are comprised of rules and assertions, which are maintained in a rules registry.

13 Claims, 14 Drawing Sheets

(56) References Cited

U.S. PATENT DOCUMENTS

| | | | |
|---|---|---|---|
| 2002/0162089 A1* | 10/2002 | Lewis | G06F 8/314 |
| | | | 717/106 |
| 2006/0206869 A1 | 9/2006 | Lewis et al. | |
| 2008/0172674 A1 | 7/2008 | Yee et al. | |
| 2013/0191688 A1 | 7/2013 | Agarwal et al. | |
| 2013/0332449 A1* | 12/2013 | Amos | G06F 17/30958 |
| | | | 707/714 |
| 2014/0032617 A1* | 1/2014 | Stanfill | G06F 17/30557 |
| | | | 707/809 |
| 2014/0033173 A1* | 1/2014 | Frenkiel | G06F 8/00 |
| | | | 717/123 |

OTHER PUBLICATIONS

PCT International Search Report and Written Opinion for PCT/US15/20793, Jun. 25, 2015, 12 Pages.

\* cited by examiner

LOGICAL DATA FLOW MAPPING RULES FOR (SUB) GRAPH ISOMORPHISM IN A CLUSTER COMPUTING ENVIRONMENT

CROSS-REFERENCE TO RELATED APPLICATIONS

This application claims the benefit of U.S. Provisional Application No. 61/953,324, filed Mar. 14, 2014 which is hereby incorporated herein by reference.

BACKGROUND

1. Field of Art

The disclosure generally relates to the field of cluster computing in particular to the mapping of a logical data flow to a directed acyclic graph representative of a cluster computer system.

2. Description of the Related Art

Cluster computing includes multiple self-contained computing devices working sequentially or in parallel as a unified system. The computing devices interact with each other via a network to solve a common problem that can be divided into many smaller, manageable problems. For example, cluster computing systems are currently employed to process big data problem sets relating to healthcare, genomics, or social networking services. Logical data flow processing is well-suited for defining these problems in a cluster computing environment. In logical data flow processing, a computing problem may be represented by a directed acyclic graph having one or more sets of nodes connected by a set of edges. However, because cluster computing systems are comprised of multiple stand-alone computing devices, the number of computing resources and configurations between them may vary significantly from cluster to cluster.

Cluster computing environments comprise a wide array of computing configurations with a wide array of programming tools. This environment presents a challenge for designers seeking to implement a write-once repetitive use application that is portable across different cluster computing systems. In a single cluster computing system, there may be several pathways for executing logic. Programming tools available aren't abstract enough to account for all possible permutations of resources in cluster computing systems. Additionally, programming languages cannot determine structural compatibility or isolate structural components of cluster computing systems. Current programming tools present challenges for implementing identical functionality reliably across different cluster platforms.

SUMMARY

One way to map a complex, computationally intensive, logical data flow to the resources of cluster computing system is through the use of directed acyclic graphs. A directed acyclic graph is comprised of nodes, and edges that represent the logical data flow to be mapped to a cluster computing system. A node may be a computing device, or server that represents a data source (e.g. producer), data sink (e.g. consumer), a data processing operation, or meta-data (e.g. head, tail, split, join, or combinations thereof) within the cluster computing system. Edges represent computational paths that connect two or more nodes and include ordinal, cardinal, or directional meta-data that describe movement of cluster system data in relation to a node. Logical data flow cannot be executed directly; it only represents a definition of the work to transform data and other resources on a cluster computing system. To be executed across a cluster of network connected computing devices, the logical data flow is compatibly mapped onto the available infrastructure resources of the target cluster. Computing devices perform a portion of the data flow but have varying capabilities, and may need to be configured appropriately to support their portion of logical data flow processing.

Mapping a logical data flow onto a target cluster computing system requires a use of two basic data flow functions. An assertion is a data flow function that tests the structural compatibility of the data flow against a target cluster's architecture. A transformation is a data flow function that modifies the directed acyclic graph so the source data flow may conform to the resources of target cluster architecture. The ability of data flow functions to transform or assert a target cluster computing system requires a set of ordered rules and actions. Rules and actions combine to provide input for assertions and transformations operations.

A rule may be a user defined data flow function argument that is comprised of one or more nodes, edges, or combinations of nodes and edges. Actions are transformation data flow function arguments such as labeling, insertion, deletion, reordering, or partitioning that define how a transformation modifies a directed acyclic graph. Because of a varied and heterogeneous logic within a directed acyclic graph, an order rule and action set may not match a data flow pattern within the directed acyclic graph. In these instances, the action is ignored and an error, no-match, or similar message describing specific locality mismatch in the directed acyclic graph can be provided to a user. If the rule is found to apply to a pattern within the directed acyclic graph the action is then applied. Additionally, rules and actions may be stored in a registry.

Users present a set of data flow functions as an ordered set of related rules and actions that allow them to functionally transform a logical data flow so that it may perform on a cluster computing system. Through the use of data flow functions, a series of assertions and transforms can be applied iteratively to convert a source logical data flow directed acyclic graph into an executable physical data flow directed acyclic graph, or set of sub-graphs. The executable physical data flow can then be applied to transform the resources of the cluster computing platform.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only.

One skilled in the art will readily recognize from the following description that alternative embodiments of the structures and methods illustrated herein may be employed without departing from the principles described herein.

Cluster Computing Environment

Figure 1:
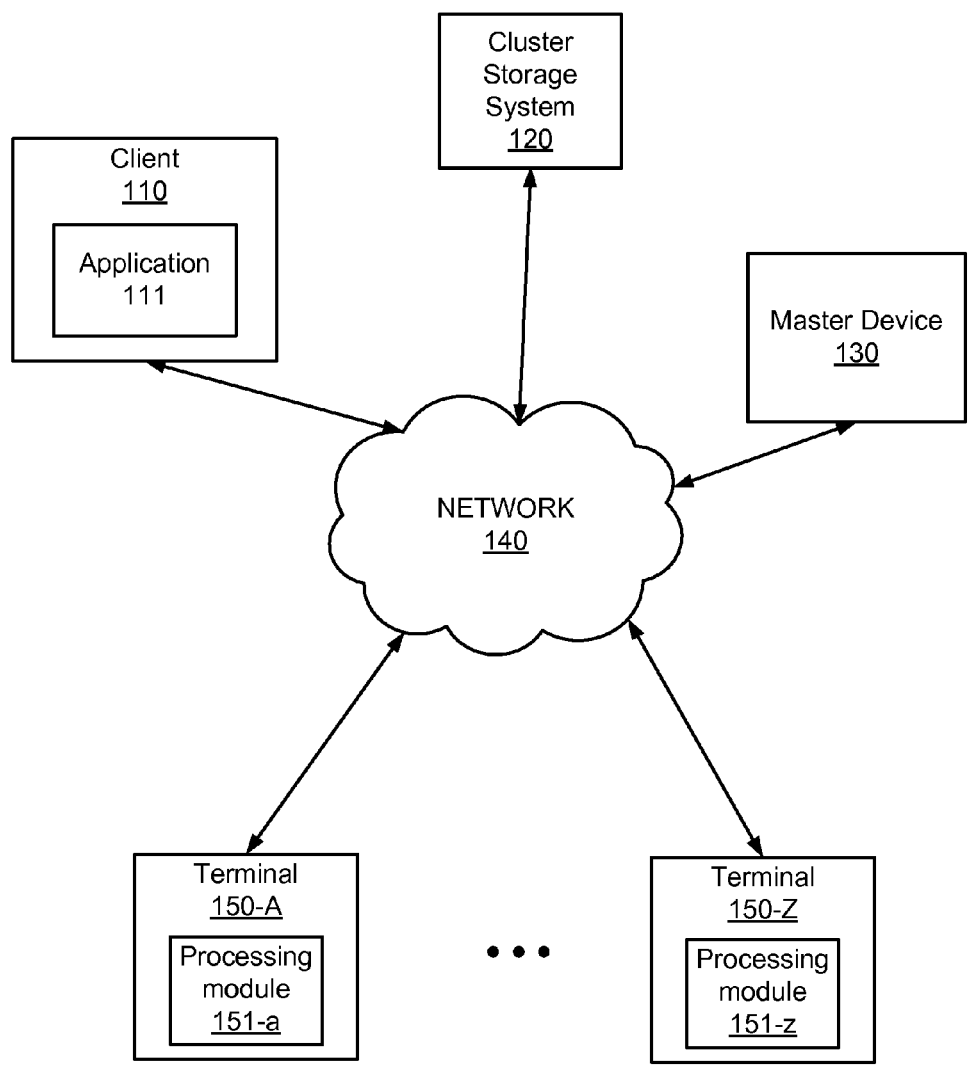
FIG. 1 is a high-level block diagram of a cluster computing environment, according to one embodiment.

FIG. 1 is a high-level block diagram of a cluster computing environment 100 for performing transformations of resources (e.g. data process or data computation). FIG. 1 illustrates a client 110, a cluster storage system 120, a master device 130, and terminals 150 connected by a network 140. Collectively, the cluster computing environment 100 is functionally configured through the use of a directed acyclic graph. The graph represents how data, such as big data sets for electronic healthcare records, is processed and flowed throughout the cluster computing environment 100.

The client 110 is a computing device with a processor and a memory that includes an application 111 for providing the master device 130 with a user program and the location of a directed acyclic graph. The user program defines data flow mapping rules that transform a source logical data flow into an executable physical data flow algorithm to be performed on cluster computing resources. The application 111 sends a copy of the user program to the master device 130. The application 111 also sends directed acyclic graph or a location of the directed acyclic graph to the master device 130. Additionally, the application may contain and store a registry for rule and action arguments for data flow functions.

The cluster storage system 120 includes one or more computing devices that may store the directed acyclic graph. The cluster storage system 120 may provide the directed acyclic graph to the systems connected to network 140 (i.e., client 110, master device 130, and computing devices 150). In some embodiments, the directed acyclic graph is stored as a plurality of partitions, where a partition stores data describing a subset of the nodes and edges of the directed acyclic graph. In one embodiment, the cluster storage system 120 stores a file for each graph partition. In another embodiment, the cluster storage system 120 stores a file per each graph partition including an output for a node computation.

The master device 130 is a computing device with a processor and a memory. The master device 130 receives the directed acyclic graph (or location of the directed acyclic graph) and a user program from the client 110, assigns partitions of the directed acyclic graph to the terminals 150, provides copies of the user program to the terminals 150, coordinates physical data flow execution on the terminals 150 and reports results of implementation and execution to the client 110.

The master device 130 maintains a list of terminals 150 that participate in physical data flow implementation and execution. The terminals 150 send registration messages to the master device 130 and in response the master device 130 registers the terminals 150 by assigning unique identifiers to the terminals 150. The master device 130 maintains a list of the registered terminals 150 which includes the identifiers of the registered terminals 150 and the addressing information of the registered terminals 150. For a respective registered terminal 150, the list includes information identifying one or more assigned directed acyclic graph partitions.

The master device 130 determines the number of partitions the directed acyclic graph will have, assigns one or more partitions to each terminal 150 and sends each terminal 150 its assigned one or more partitions (or information identifying the assigned one or more partitions). A partition of a directed acyclic graph includes a subset of the nodes and edges of the directed acyclic graph. The number of partitions may be specified in the user program or determined by a partition function stored in the master device. The master device 130 is not assigned any portion of the directed acyclic graph.

The master device 130 sends each terminal 150 a copy of the user program and initiates the execution of the user program on the terminal 150. More specifically, the master device 130 signals the beginning of a logical data computational processing. The master device 130 maintains statistics about the progress of a computation and the state of the directed acyclic graph, such as the total size, the number of active nodes, and the timing and message traffic of recent processing of data. After the computational processing completes the master device 130 aggregates results from the terminals 150 and sends the results to the client 110 or the cluster storage system 120. In some embodiments, the results include a set of values explicitly output by the nodes.

A terminal 150 is a computing device with a processor and a memory. The terminals 150 and the master device 130 are similar types of computer devices in one embodiment. A terminal 150 receives from the master device 130 the directed acyclic graph for one or more partitions (or receives the location of the directed acyclic graph from the master device 130 and retrieves the directed acyclic graph from the received location) and stores the received data in local memory. The terminal 150 also stores and executes a copy of the user program on the one or more partitions stored in local memory.

The terminals 150 process executable physical data flow from a user program in response to receiving instructions from the master device 130. During cluster processing, the terminal 150 executes a defined function for each active node in the one or more partitions stored on the terminal 150. The terminals 150 communicate on behalf of their nodes and send messages on behalf of one node to another. A node that is active during a data flow processing may send messages to nodes in order to obtain information about other nodes or edges. When the data flow processing is finished, the terminal 150 sends the results generated to the user program from the master device 130.

A possible computation includes initialization of a transformed directed acyclic graph via execution of the physical data flow on multiple terminals 150. The data flow includes defined functions that are repeatedly executed by the terminals 150 sequentially or in parallel. Each terminal 150 executes a defined function for all of the active nodes in respective partitions of the terminals. A terminal 150 can modify a node's state or that of the node's incoming or outgoing edges, or receive messages for a node. The application of physical data flow to the cluster terminates when all nodes are simultaneously inactive and there are no messages in transit. The output of the algorithm is a set of values output by the terminals 150 for the vertices.

The network 140 represents the communication pathways between the client 110, the master device 130 and the terminals 150. In one embodiment, the network 140 uses standard Internet communications technologies and/or protocols. Thus, the network 140 can include links using technologies such as Ethernet, IEEE 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
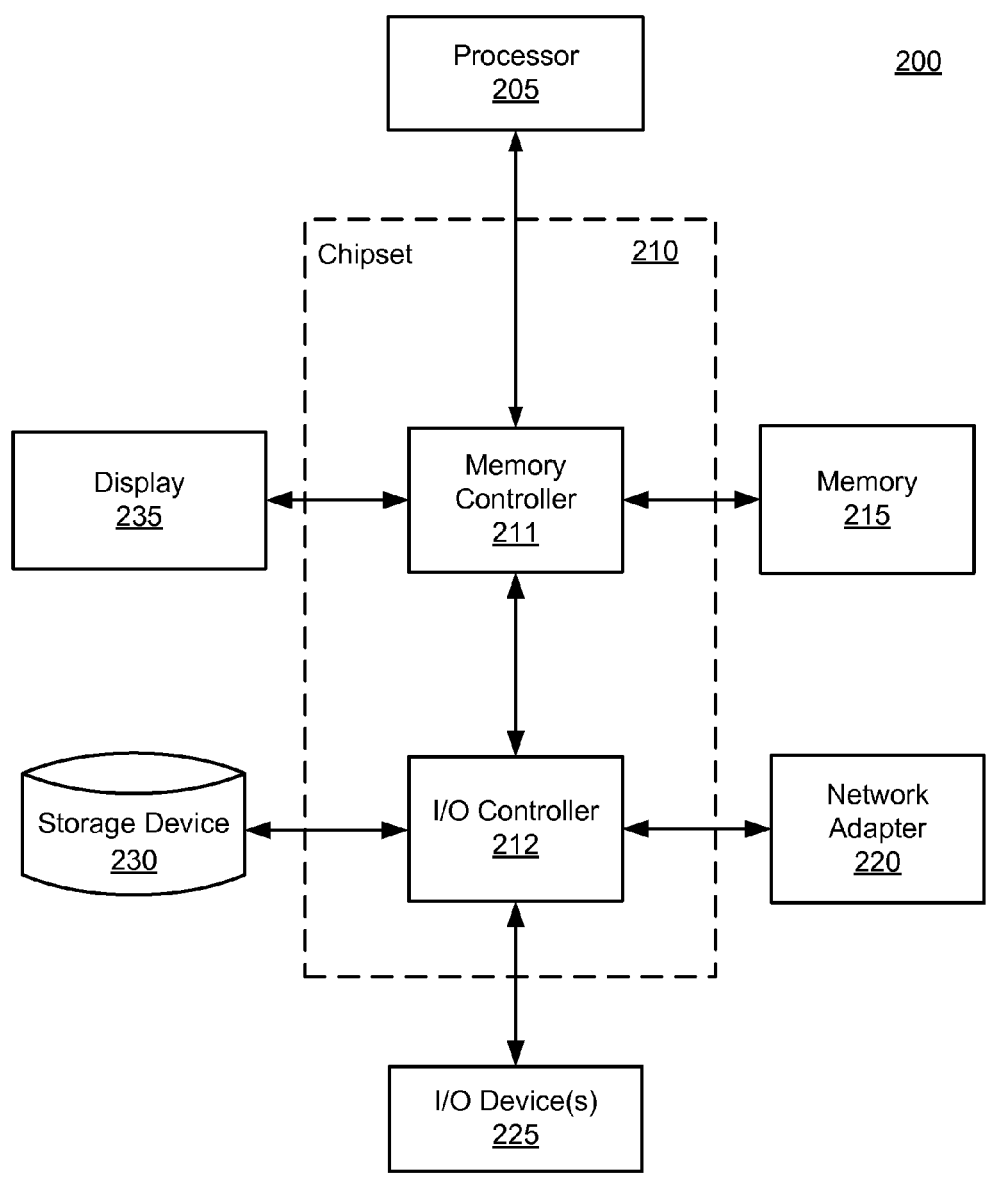
FIG. 2 is a high-level block diagram illustrating an example of a computing device, according to one embodiment.

FIG. 2 is a high-level block diagram illustrating physical components of a computer 200 used as part of the client 110, master device 130 and/or terminals 150 from FIG. 1, according to one embodiment. Illustrated are a chipset 210 coupled to at least one processor 205. Coupled to the chipset 210 are a volatile memory 215, a network adapter 220, I/O device(s) 225, a storage device 230 representing a non-volatile memory, and a display 235. In one embodiment, the functionality of the chipset 210 is provided by a memory controller 211 and an I/O controller 212. In another embodiment, the memory 215 is coupled directly to the processor 205 instead of the chipset 210. In some embodiments, memory 215 includes high-speed random access memory, such as DRAM, SRAM, DDR RAM or other random access solid state memory devices.

The storage device 230 is any non-transitory computer-readable storage medium, such as a hard drive, compact disk read-only memory (CD-ROM), DVD, or a solid-state memory device. The memory 215 holds instructions and data used by the processor 205. The I/O device 225 may be a mouse, track ball, or other type of pointing device, and is used in combination with a keyboard to input data into the computer 200. The display 235 displays images and other information from for the computer 200. The network adapter 220 couples the computer 200 to the network 140.

As is known in the art, a computer 200 can have different and/or other components than those shown in FIG. 2. In addition, the computer 200 can lack certain illustrated components. In one embodiment, a computer 200 acting as a server may lack an I/O device 225, and/or display 218. Moreover, the storage device 230 can be local and/or remote from the computer 200 (such as embodied within a storage area network (SAN)), and, in one embodiment, the storage device 230 is not a CD-ROM device or a DVD device.

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 230, loaded into the memory 215, and executed by the processor 205.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Directed Acyclic Graph

Figure 3:
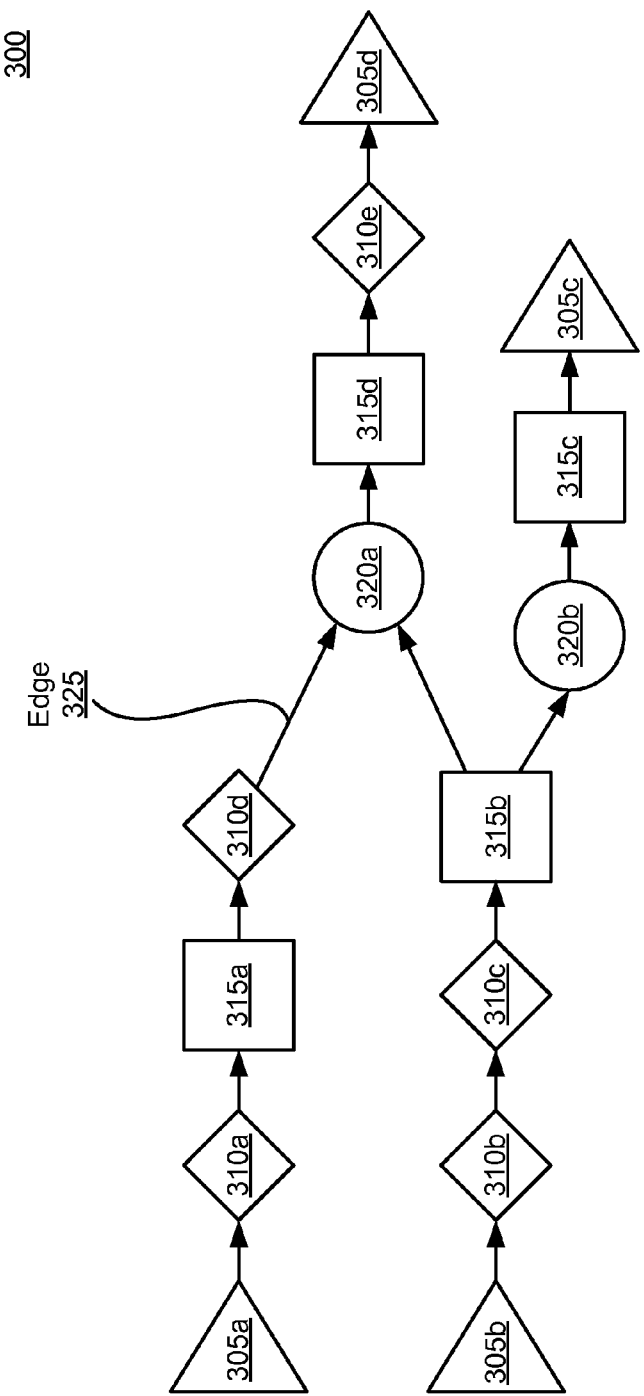
FIG. 3 is an example directed acyclic graph, according to one embodiment.

FIG. 3 is an example of a directed acyclic graph 300 comprised of nodes (305, 310, 315, and 320) and edges 325. Nodes represented by different shape groupings, may indicate different user provided application functions (e.g. data computation or processing, node management, data storing, or data access) for computing devices with in a cluster computing platform. Edges 325, represented by arrows, express the direction of data flow within the graph. Directed acyclic graphs may be extensively composed of nodes and edges making analysis of the graph in its entirety computationally demanding. Directed acyclic graphs may then be abstracted into hierarchical divisions that enable an iterative analysis. For instance, a directed acyclic graph may be divided into two or more graphical patterns, or subgraphs. The subgraphs may then be further divided into topological patterns. The number of nodes within each hierarchical level is not definite and may correspondingly vary with the size of individual directed acyclic graphs. The directed acyclic graph 300 will be used in conjunction with FIG. 4 and FIG. 5 to further illustrate isomorphic data flow functions.

Directed Acyclic Graph Transformation

Figure 4:
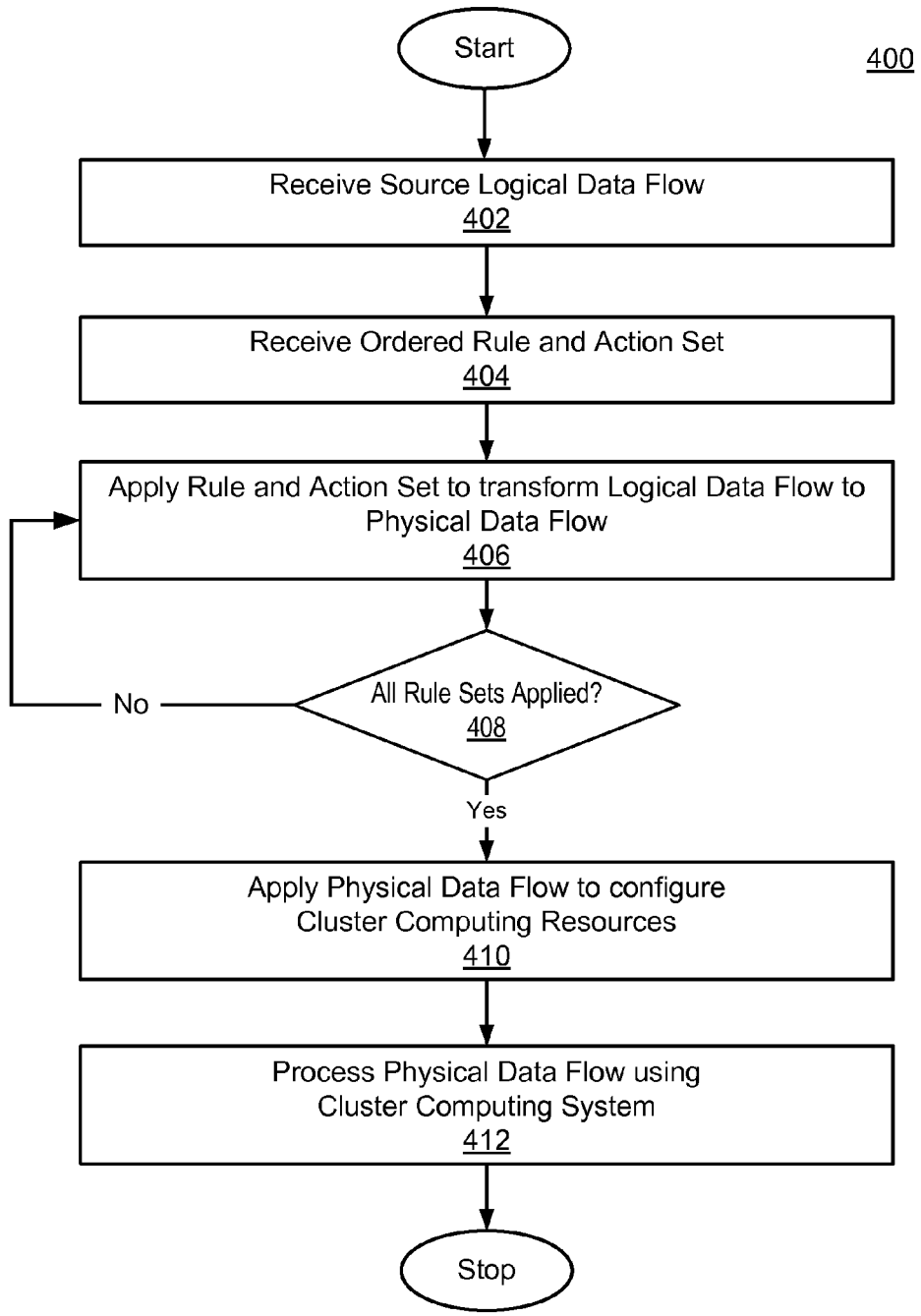
FIG. 4 is a flow diagram that illustrates a process for iteratively mapping a source logical data flow to the resources of a cluster computing system, according to one embodiment.

FIG. 4 is a flow diagram that illustrates a process for iteratively mapping a source logical data flow into a directed acyclic graph representative of cluster computing resources. This process 400 is performed by a cluster computing system having one or more computing devices each with a processor and non-transitory memory. The non-transitory memory stores one or more programs to be executed by the one or more processors. The one or more programs include instructions for the process 400.

A client device 110 receives 402 a source logical data flow and receives 404 a list of ordered rule and actions. The source logical data flow is a definition of work to transform a directed acyclic graph, representative of a cluster computing system, into a physical data flow. The physical data flow is configured 410 to the cluster computing resources and is the definition of work to be processed 412 by the cluster computing system. The list of ordered rule and actions describe instructions for mapping and transforming the source logical data flow to the directed acyclic graph 300. The directed acyclic graph 300 describes transformable resources of a cluster computing system through nodes and edge relationships.

The client device 110 provides rules and actions as arguments to data flow functions. The data flow functions apply 406 the rules and actions in order to transform the source logical data flow into a physical data flow. As an example and further described below in conjunction with FIG. 5, a CompleteTransform 580 data flow function allows a client device 110 to identify and transform subgraphs within a directed acyclic graph 300. Its recursive application may transform all subgraphs within the directed acyclic graph 300. Each transformation representing a new version of the directed acyclic graph 300 until the directed acyclic graph 300 has been transformed in its entirety, into a physical data flow. The CompleteTransform 580 function identifies relationships among the nodes and edges of the directed acyclic graph 300 by matching distinguished nodes from the source dataflow to the nodes of the directed acyclic graph 300. In some embodiments, the CompleteTransform 580 function may insert or delete nodes and edges to test for functional similarity. If the CompleteTransform 580 function determines no isomorphism exist, between the source dataflow and a subgraph within the directed acyclic graph 300, an error, or other, message describing the result may be sent to the client device 110. If the CompleteTransform 580 function determines isomorphism exists between the source logical data flow and a subgraph then the CompleteTransform 580 function may identify the location in the directed acyclic graph 300 where the isomorphism exist. For example, the identifying location information may include a reference to a node or an edge.

After isomorphic relationships have been determined by the CompleteTransform 580 function, the subgraph may then be transformed 406 by the function. The transformation may include adding label meta-data field on nodes and edges, inserting, deleting, reordering, and partitioning sets of node and edge values into sub-graph. When the transform is complete, the client application 110 determines 408 if there are additional rule sets to be applied. If additional rule and action sets remain, the client application 110 provides the rule and action sets to the CompleteTransform 580 function and the process repeats. If the lists of rule and action sets are exhausted, then the directed acyclic graph 300 has been transformed in its entirety into a physical data flow. The executable physical data flow is sent from the client device 110 to the master device for application 410 and transformation of the cluster computing resources. With the cluster computing resources transformed to match the logical data flow functionality, the physical data flow is processed 412 within the cluster computing system.

Data Flow Functions

FIGS. 5a-5j are example functions used to match or transform source logical data to data patterns into a directed acyclic graph 300. Data flow functions may be first order functions (FIGS. 5a-5c) or higher order functions (FIGS. 5d-5j) that receive rule and action arguments and return a value as result of argument processing. First order functions perform matching or transformation for nodal and edge patterns within topologies while higher order functions perform matching or transformations of subgraphs. In one embodiment, first order functions are nested in with higher order graph functions. The receiving of subgraphs as rule arguments, allows higher order functions to analyze the directed acyclic graph 300 at its highest hierarchical abstraction.

A specific type of rule is an expression graph 505, it can include nodes, edges, Boolean logic (e.g. and, or, not, etc.) for defining node meta-data (e.g. head, tail, split, join, etc.), edge meta-data (direction, ordinality, cardinality) as arguments to first and higher order functions. Expression graphs 505 allow functions to search for patterns at an elemental level and therefore in more efficient manner. This is especially efficient when a directed acyclic graph and the cluster computing system it represents consist of a network of 100,000 or more nodes or computing units.

Figure 5A:
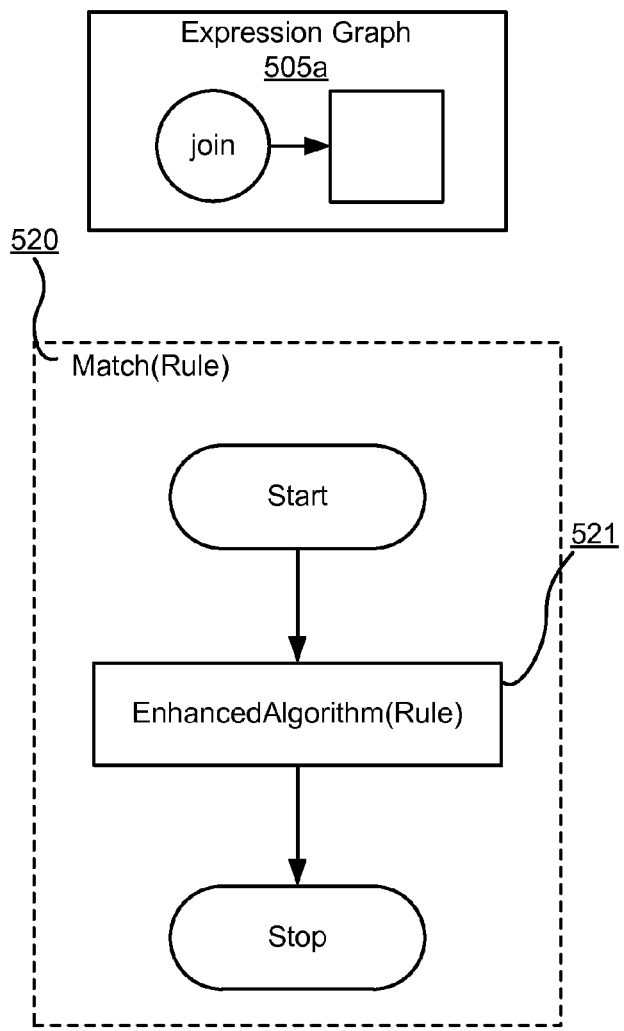
FIGS. 5a-5j are examples of data flow operations used to match and transform sub-graphs within a larger directed acyclic graph.
Figure 5A:
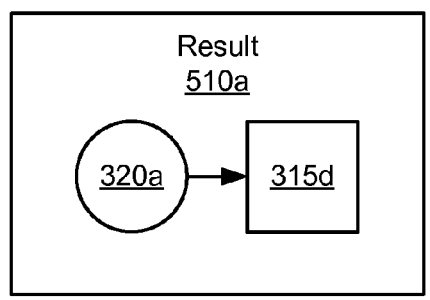

Data flow functions that test for structural pattern isomorphism are called assertions. Assertions compare a received rule argument to data patterns within a directed acyclic graph. If the rule and pattern are isomorphic, the assertion returns a highlighted pattern location. In certain instances, it is more practical to identify structural patterns that are not yet isomorphic and would need to be transformed. In one embodiment, if matching structural patterns are found, a matching error message is provided. In an alternative embodiment, an error message specifying a reason for a mismatch is provided. In these instances, it is more practical to confirm a structural pattern transformation is complete. In addition to receiving a rule argument, transformations functions receive an action argument that modifies (e.g. insert, delete, reorder, label, partition, etc.) the matched logical data pattern of the graph. Labels inform subsequent assertions and transformations of additional meta-data added to nodes or edges. A partition transformation divides a logical data pattern into two or more sub-graphs FIG. 5a illustrates an example of a first order data flow operation. The operation comprises a Match 520 data flow function, an expression graph 505a rule argument, and an operational result 510a of the data flow function. The expression graph 505a is comprised of nodes with different data flow roles. They are connected by an edge that originates from the left node and terminates on the right node. The left node includes a join meta-data indicating multiple edges in the directed acyclic graph 300 should converge on the left node. The right node is used to anchor the expression graph 505a to data patterns in a targeted directed acyclic graph.

The expression graph 505a is inputted into the Match 520 data flow function where it is processed by an enhanced algorithm 521. The enhanced algorithm 521 performs isomorphic sub-graph matching when matching rules against graph patterns. The enhanced algorithm 521 traverses the directed acyclic graph 300 until a square node 315 matching the anchor is found. The enhanced algorithm 521 then determines if a square node 315 precedes a circle node 320 and if there is a join operation associated with the circle node 320. This sequence is repeated until there is a pattern match for the expression graph 505a. The Match 420 function returns the result 510a. The Match 520 data flow function won't return the node combination of nodes 315c and 320b because the combination doesn't contain a second edge as required by the join meta-data in the expression graph 505a.

Figure 5B:
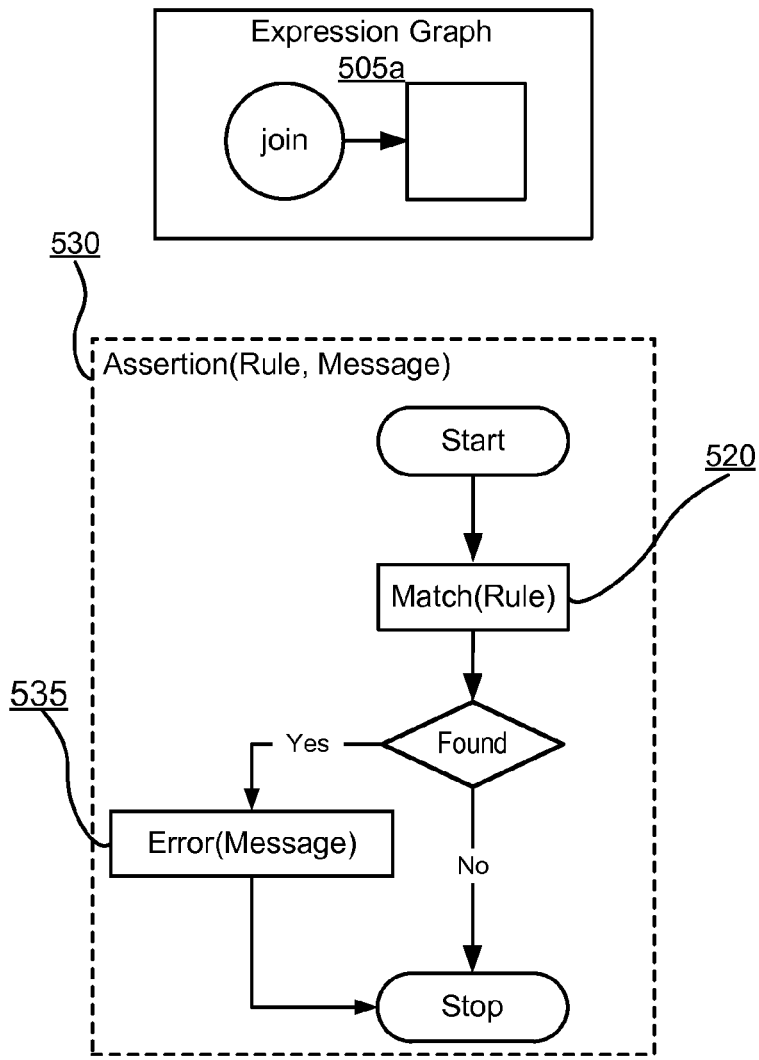
Figure 5B:
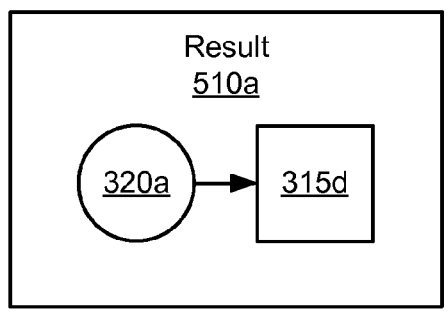

FIG. 5b illustrates a second example of a first order data flow operation. The operation comprises of an Assertion 530 data flow function, an expression graph 505a rule argument, and a result 510a of the operation. The Assertion 530 data flow function is comprised of the Match 520 data flow function described in FIG. 5a, and an error 535 function. The error function 535 returns an error statement if a match is found. The expression graph 505a is inputted into the Match 520 data flow function where it is processed by the Match 520 function. As in FIG. 5a, the Match 520 data flow function returns the result 510a. Additionally, the Assertion 530 subgraph function will also return an error statement describing the match. Note, the combination of nodes 315c and 320b will not return a match because a join involves two or more edges converging on a single node.

Figure 5C:
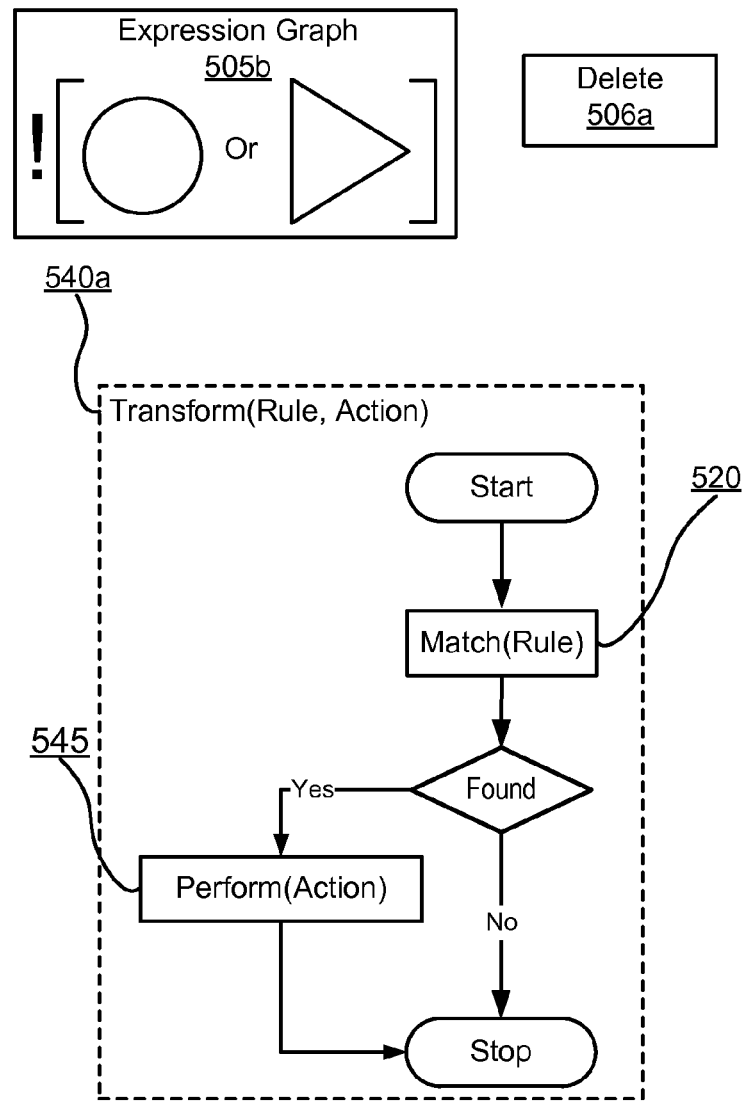
Figure 5C:
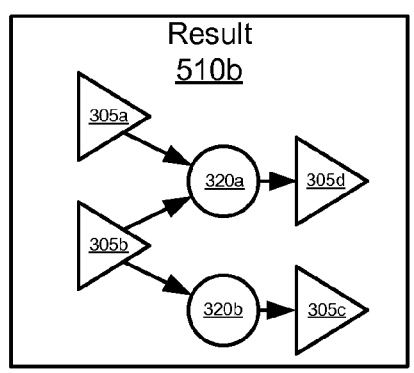

FIG. 5c illustrates a third example of a first order data flow operation. The operation comprises of a Transform 540a data flow function, an expression graph 505b as rule argument, a delete 506a action argument, and a result 510b of the data flow operation. The Transform 540a function modifies matched logical data within the directed acyclic graph 300 based on the type of action argument provided. The Transform 540a data flow function is comprised of the Match 520 function, and an action 545 function. The action 545 function performs a graph modification based on the action argument type received, in this example a delete 506a argument.

In FIG. 5c an expression graph 505b and a delete action 506a argument are provided to the Transform 540a data flow function and applied to the directed acyclic graph 300. Each circle node 305 and triangle node 320 in the directed acyclic graph 300 are identified as distinguished nodes, nodes that are logically relevant to the operation. The remaining nodes (310, 315) are deleted, leaving the remaining distinguished nodes unconnected. The Transform 540a function connects the remaining distinguished nodes in a manner so that result 510b retains the edge topology of the original directed acyclic graph 300.

Figure 5D:
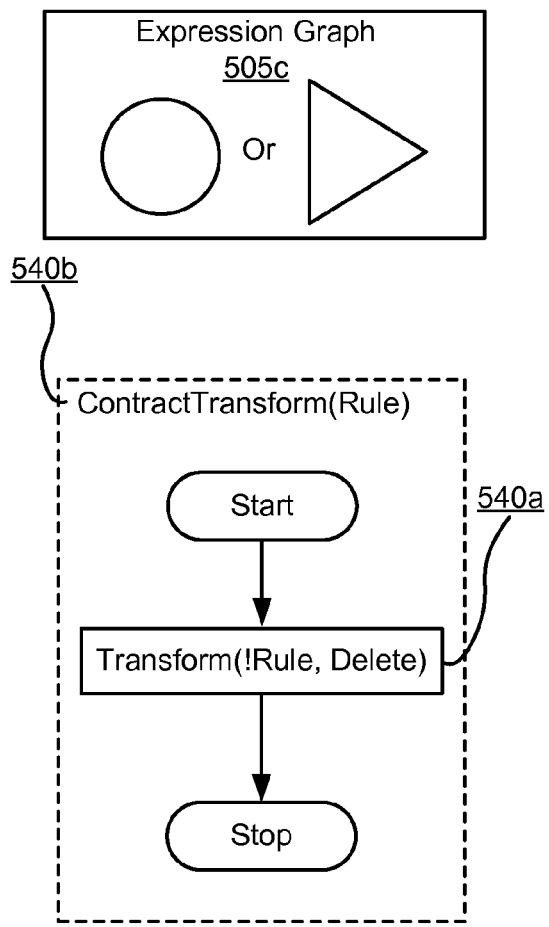
Figure 5D:
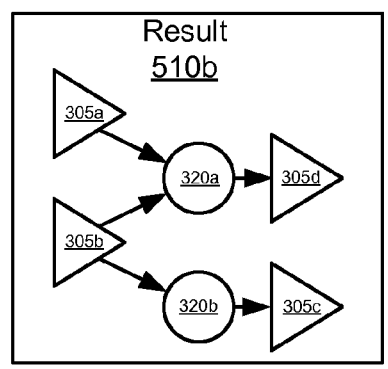
Figure 5E:
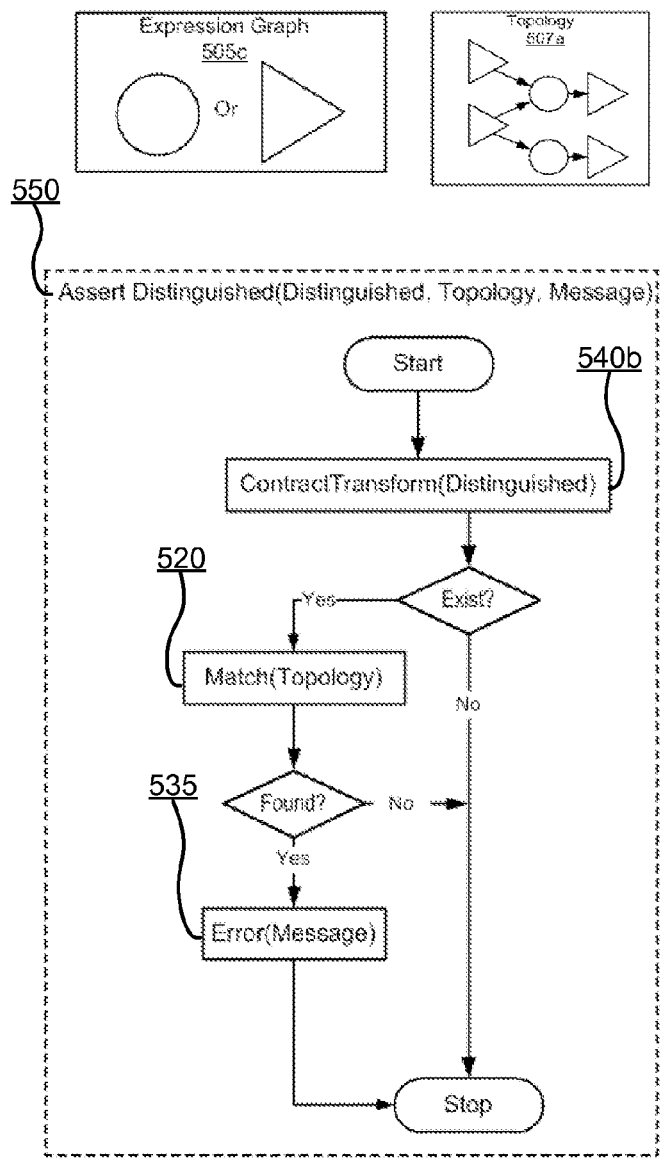
Figure 5E:
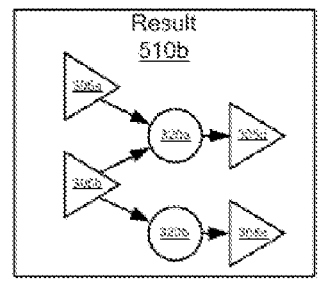

FIG. 5d illustrates a special case of the Transform 540a function, the ContractTransform 540b. It negates the provided rule argument 505c, includes a delete action argument and is functionally identical to the Transform 540a function example described in FIG. 5c. FIG. 5e illustrates a first example of a higher order data flow operation. The operation comprises of an AssertDistinguished 550 data flow function, an expression graph 505c of distinguished elements as rule argument, a topology 507a rule argument, and a highlighted result 510b of the data flow operation. The AssertDistinguished 550 data flow function allows the algorithm to identify a topology, within the directed acyclic graph 300, against a topology 507a argument. If a match is found an error message and the highlighted topology within the directed acyclic graph 300 are returned. The AssertDistinguished 550 data flow function is comprised of a ContractTransform 540b function, Match 520 function, and an error 535 function.

In FIG. 5e an expression graph 505b and a topology 507a argument are provided to the AssertDistinguished 550 function and applied to the directed acyclic graph 300. The expression graph 505c is provided as an argument to the ContractTransform 540b function. If no topologies can be contracted with the provided argument 505b, the function completes its processing. If a topology is found by the ContractTransform 540b function, the result is provided to the Match function 520 where it is compared against the topology 507a argument. If the results are not isomorphic the function completes its processing. However, if the topology argument 507a provided results in a match with the result of the ContractTransform 540b function, an isomorphic error message is provided a result 510b is highlighted in the directed acyclic graph 300.

Figure 5F:
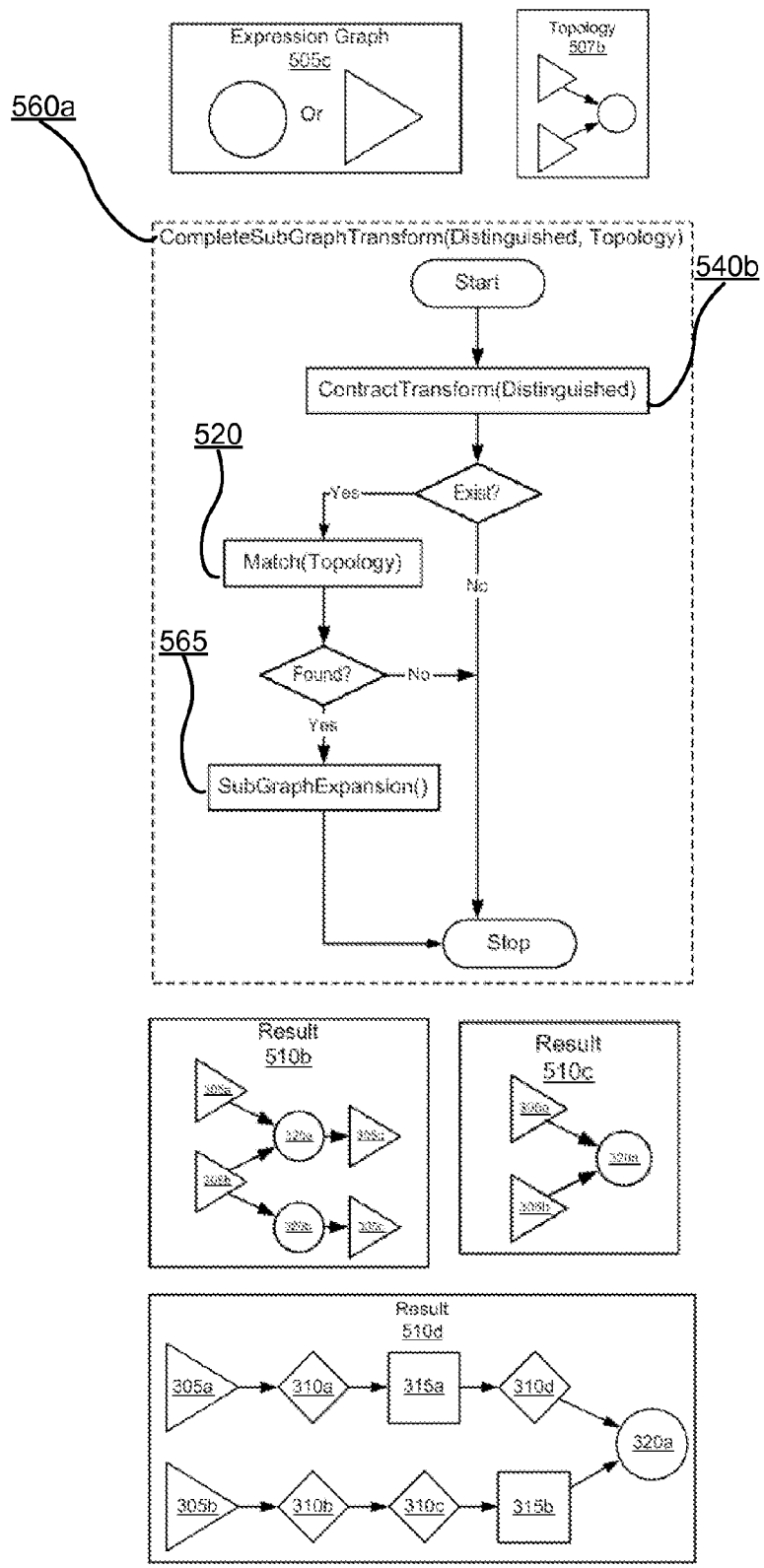

FIG. 5f illustrates a second example of a higher order data flow operation. The operation comprises of a CompleteSubGraphTransform 560a data flow function, an expression graph 505c of distinguished nodes as a rule argument, a topology 507b rule argument, two intermediary results (510b and 510c) and a final result 510d of the data flow operation. The CompleteSubGraphTransform 560a data flow function allows the algorithm to identify a subgraph that is functionally equivalent to the received topology argument 507b then produce a resulting 510d subgraph. The CompleteSubGraphTransform 560a data flow function is comprised of a ContractTransform 540b function, Match 520 function, and SubGraphExpansion 565 function. The SubGraphExpansion 565 receives, if found, a topology identical to 507b and expands the result back to an original node/edge configuration before contraction in the ContractTransform 540b function.

In FIG. 5f an expression graph 505c and a topology 507b argument are provided to the CompleteSubGraphTransform 560a function and applied to the directed acyclic graph 300. The expression graph 505c is provided to the ContractTransform 540b function and if a topology is found by the ContractTransform 540b function, the result is provided to the Match 520 function. In FIG. 5f, the 510b result processed by the function ContractTransform 540b, is intermediary. The first intermediary result 510b is provided to the Match 520 function and is traversed until the topological argument 507b is found. If the topological argument 507b is found as a pattern within first intermediary result 510b, the Match 520 function provides a second intermediary result 510c to the SubGraphExpansion 565 function. The SubGraphExpansion 565 function expands the second intermediary result 510c to functionally match the topology of subgraph final result 510d found within the directed acyclic graph 300. The subgraph boundaries are determined by the distinguished elements of the 507b topology (320a, 305a, and 305b).

The contracted first intermediary result 510b may appear to be a superfluous step in light of the fact the second intermediary result 510c is expanded to produce the final result 510d. The intermediary result 510b, however, provides the algorithm a highly efficient way to perform subsequent isomorphism by reducing the search space while making isomorphism computationally cheaper. If the directed acyclic graph 300 represented a cluster computing system of a 100,000 nodes as opposed to fifteen, searching for the topology argument 507b directly in the directed acyclic graph 300 would expend an unnecessarily large amount of time and space (i.e. memory needed for a larger algorithm, input data, output data, processing, etc.). The first intermediary result 510b provides a reduced graph, comprised of solely distinguished nodes, for the Match 520 function to traverse. This decreases the complexity of matching the 510c result to the functionally equivalent subgraph result 510e.

Figure 5G:
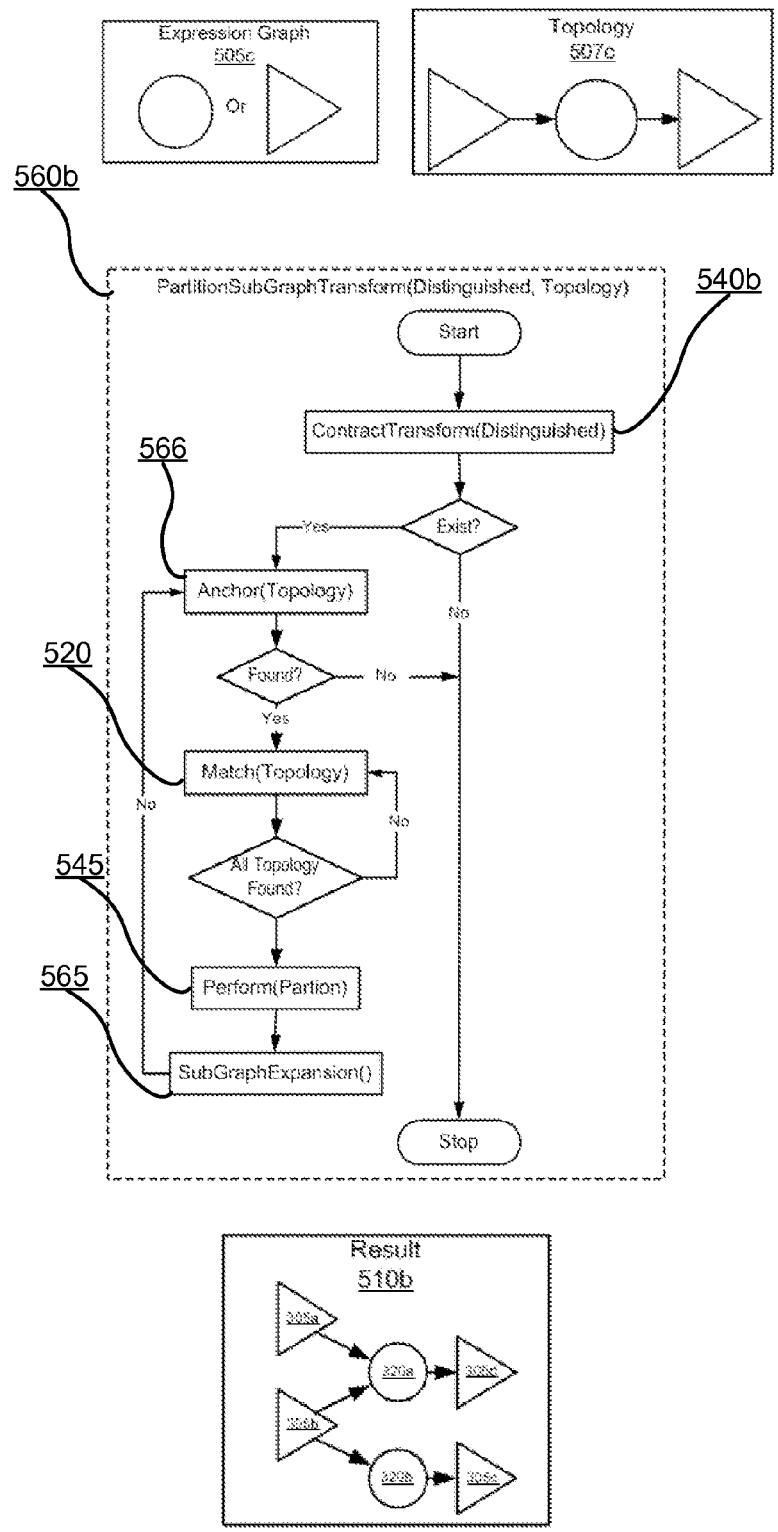
Figure 5H:
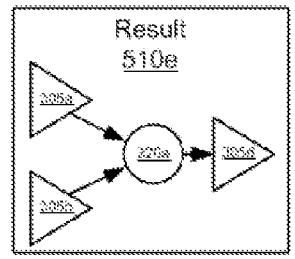
Figure 5H:
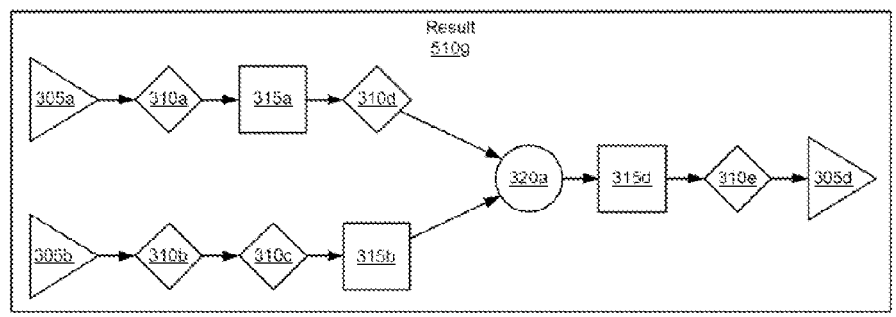
Figure 5H:
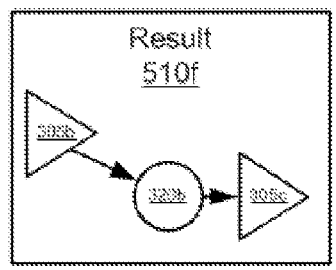
Figure 5H:
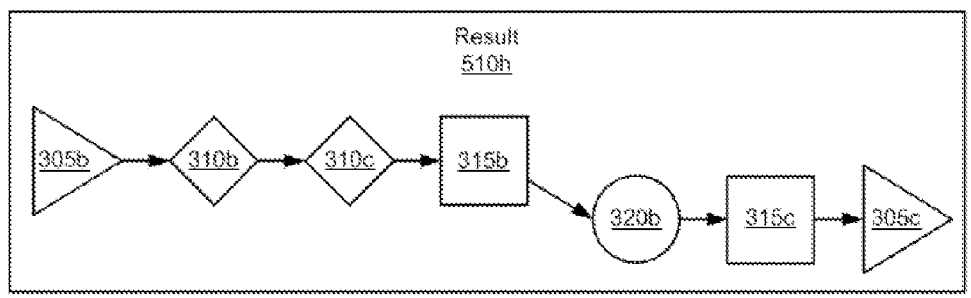

FIGS. 5g and 5h illustrate a special case of the CompleteSubGraphTransform 560a function, the PartitionSubGraphTransform 560b. The operation comprises the PartitionSubGraphTransform 560b data flow function, an expression graph 505c as rule argument, a topology 507c argument, three intermediary results (510b, 510e, 5010, and two final expansion results (510g, 510h) of the data flow operation. The PartitionSubGraphTransform 560b partitions a directed acyclic graph into one or more subgraphs. The PartitionSubGraphTransform 560b data flow function is comprised of the ContractTransform 540b function as described in FIG. 5d, an Anchor Function 566, Match 520 function, perform 545 function, and a SubGraphExpansion 565 function.

In FIGS. 5g and 5h an expression graph 505c argument is provided to the PartitionSubGraphTransform 560b data flow function and applied to the directed acyclic graph 300. The PartitionSubGraphTransform 560b function, in one embodiment, first reduces the directed acyclic graph 300 to a contracted intermediary result 510b comprised of only distinguished nodes and as described in the operation of FIG. 5d. If a contracted graph doesn't exist then the function processing completes. The topology 507c is provided as an input to the Anchor 566 function and compared against the intermediary result 510b. An anchor from the topology 507c argument is used to search for similar nodes 305 within the intermediary result 510b. If a matching node is not found the function processing completes. If a matching node 305d is found, the of the topology 507c argument is provided as an input to the Match 520 function which will then pivot around the anchor 305d searching for the complete topology argument 507c in the intermediary subgraph result 510b. The first isomorphic return is the node combination of 305d, 320a, and 305a. Because the additional topology combinations remain, the Match 520 function will again pivot around the anchor 305d this time returning the node combination 305d, 320a, and 305b. With all node topologies found the perform 545 function will provide the intermediary result 510e to the SubGraphExpansion 565 function where it is expanded into a final subgraph result of 510g.

The Anchor 566 function is again revisited and the function searches for an additional anchor within the topology of the intermediary result 510b. When the resulting anchor match 305c is found, the Match 520 function compares the topology 507c argument against the intermediary result 510b by pivoting around the anchor node 305c. The resulting intermediary topology result 510f is then provided by the perform 545 function and passed to the SubGraphExpansion 565 function where it is expanded into the final subgraph result 510h. The Anchor 566 function is revisited again but because this time all anchors have been found the function completes its processing.

Figure 5I:
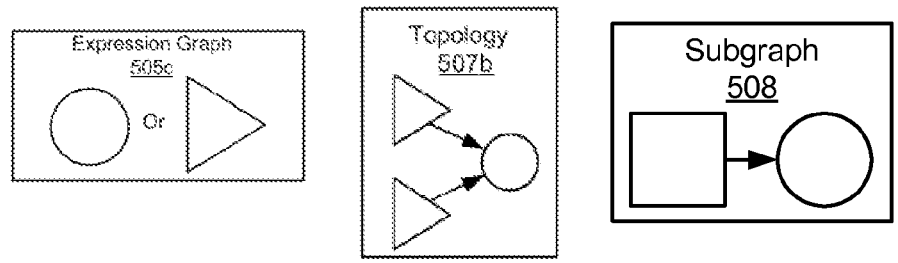
Figure 5I:
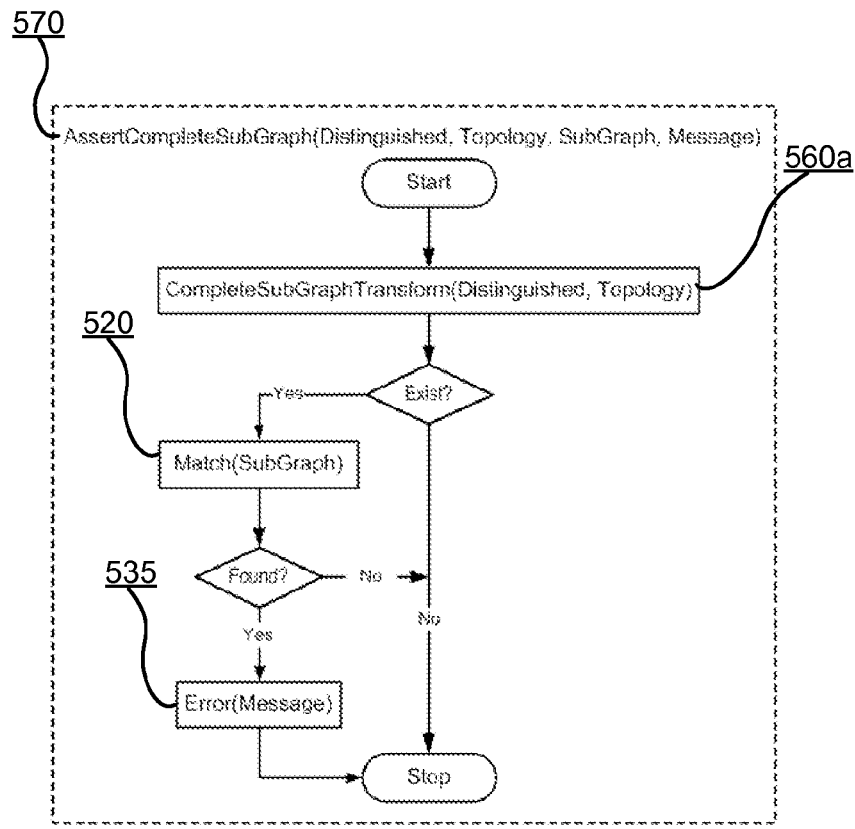
Figure 5I:
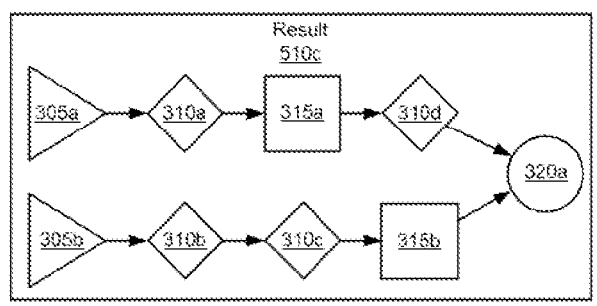

FIG. 5i illustrates a third example of a higher order data flow operation. The operation comprises of an AssertCompleteSubGraph Transform 570 data flow function, an expression graph 505c of distinguished nodes as rule argument, a topology 507b rule argument, a subgraph rule argument 508, and a result 510c of the data flow operation. The AssertCompleteSubGraph Transform 570 data flow function allows the algorithm to identify a subgraph argument, within a subgraph produced as a result of CompleteSubGraph Transform 560 function. If the subgraph argument is found within the identified subgraph, the function provides an error message and highlights the subgraph within the directed acyclic graph 300. The AssertCompleteSubGraph Transform 570 data flow function is comprised of a CompleteSubGraphTransform 560 function as described in FIG. 5f, Match 420 function, and an error 535 function.

In FIG. 5i an expression graph 505c, a topology 507b argument, and subgraph 508 argument are provided to the AssertCompleteSubGraph Transform 570 function and applied to the directed acyclic graph 300. The expression graph 505c and topology 507b are provided to the CompleteSubGraph Transform 560 function and if a subgraph can't be produced, the function completes processing. If a subgraph is produced by the CompleteSubGraph Transform 560 function, the resulting 510c subgraph is provided to the Match function 520 where it is compared against the subgraph 508 argument. If the subgraph 508 argument is not found within the subgraph result 510c, than the function completes processing. However if the subgraph 508 argument is found within the result 510c, an error message is provided and the result 510c is highlighted in the directed acyclic graph 300.

Figure 5J:
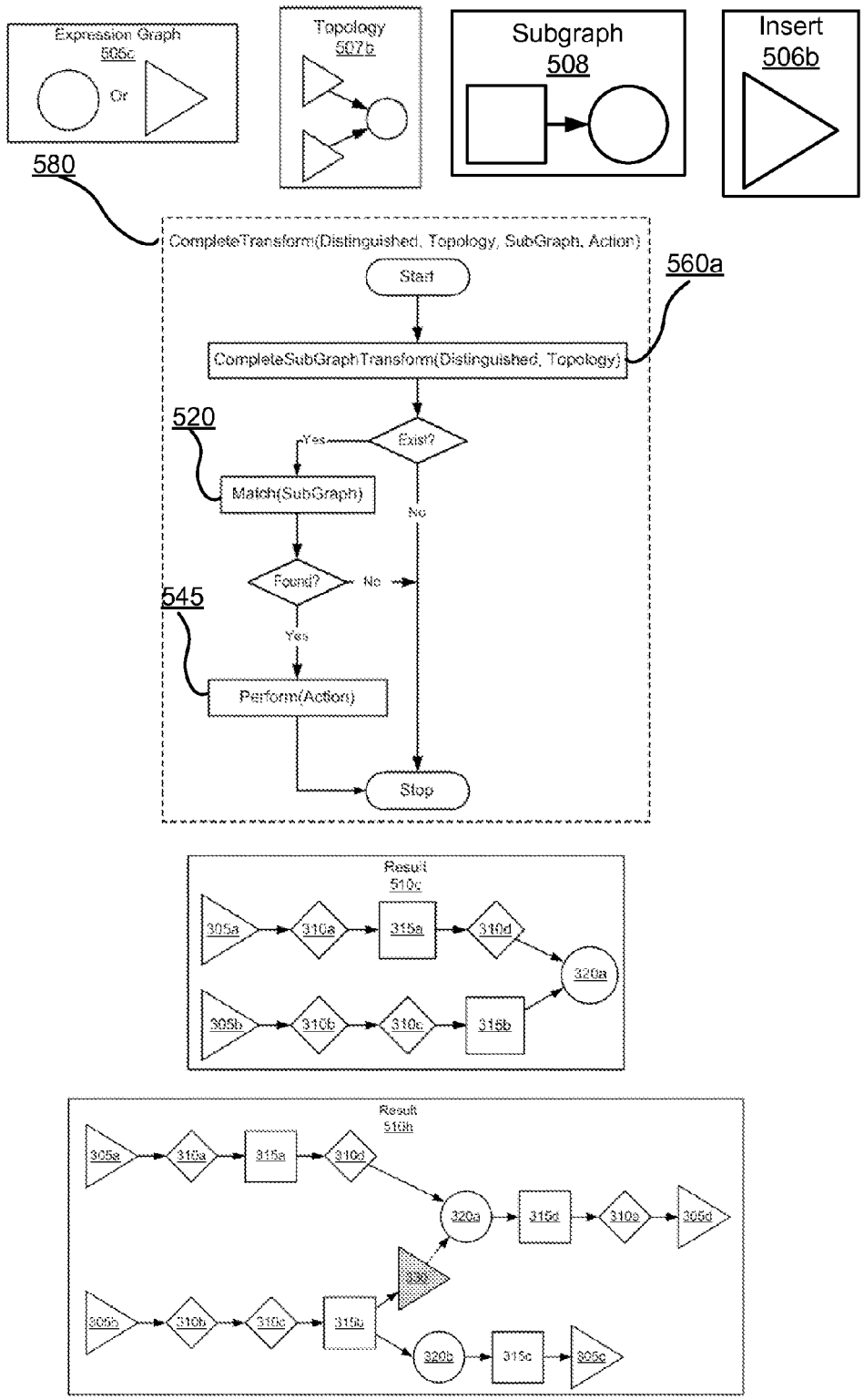

FIG. 5j illustrates a fourth example of a higher order data flow operation. The operation comprises of a CompleteTransform 580 data flow function, an expression graph 505c, a topology rule argument 507b, a subgraph rule argument 508, an insert 506b action argument, an intermediary result 510c and a result 510d of the data flow operation. The CompleteTransform 580 data flow function allows the algorithm to identify and transform a subgraph within the directed acyclic graph 300. When applied recursively, the CompleteTransform 580 transforms all subgraphs until a directed acyclic graph has been transformed in its entirety.

In FIG. 5j an expression graph 505b, a topology 506, a subgraph 508, and an insert 509 argument are provided to the AssertCompleteSubGraph Transform 570 function and applied to the directed acyclic graph 300. The expression graph 505b and topology 506 arguments are passed to the CompleteSubGraphTransform 560 function producing an intermediary subgraph result 510c. The resulting subgraph 510c is passed to the Match 520 function and compared with the subgraph 508 argument. If the subgraph 508 argument is not found, the function processing is complete. If the subgraph 508 argument is found within the intermediary result 510c, the insert 509 argument is passed to the perform 545 function and a triangle is then inserted between the square node 315b and circle node 320a, connected by edges an incorporated into the directed acyclic graph 300.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-5. Modules may constitute either software modules (e.g., code embodied on a machine-readable medium or in a transmission signal) or hardware modules. A hardware module is tangible device capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 205, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for the mapping of logical data flow rules using a clustered computer system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method of directed acyclic graph transformation, comprising:
receiving a memory resident directed acyclic graph comprised of nodes connected by edges that describes resources in a cluster computing system;
receiving a memory resident logical data flow comprised of rules and actions that describe instructions to structurally map or transform a directed acyclic graph;
applying a function stored in a computer readable memory, wherein the function may use the logical data flow to map or modify the directed acyclic graph into an executable physical data flow;
transmitting the executable physical data flow to the cluster computing system whereby the cluster computing system is functionally transformed to match the results of the executable physical data flow.

2. The computer-implemented method of claim 1, wherein the applying the function to the directed acyclic graph is repeated for a plurality of iterations and the modified directed acyclic graph for each iteration is stored in memory.

3. The computer-implemented method of claim 1, wherein a function may be nested within another function.

4. The computer-implemented method of claim 1, wherein a function is an assertion function that comprises:
receiving a set of rule arguments that define node and edge relationships for a directed acyclic graph;
identifying and mapping the nodes and edges from the set of rules to the nodes and edges of the directed acyclic graph;
returning a location of the mapped nodes and edges of the directed acyclic graph;
displaying an error message if the result of the correlating does not match.

5. The computer-implemented method of claim 1, wherein a function is a transformation function that comprises:
receiving a set of rule arguments that define node and edge relationships for a directed acyclic graph;

receiving a set of action arguments that define transformations for node and edge relationship within a directed acyclic graph;

and transforming the nodes and edges relationships of a directed acyclic graph to conform with the rule and action arguments.

6. The computer-implemented method of claim 1, wherein an action argument may comprise labeling, insertion, deletion, reordering, or partitioning node and edge relationships.

7. The computer-implemented method of claim 1, wherein a rule argument may comprise an expression graph that allows for pattern matching within a directed acyclic graph.

8. The computer-implemented method of claim 7, wherein an expression graph describes relationships between nodes and edges, using Boolean algebra to further define the relationships.

9. The computer-implemented method of claim 1, wherein a node represents a data source, a data sink, a data processing operation, or meta-data.

10. The computer-implemented method of claim 9, wherein node meta-data represents a node head, a node tail, a node split, a node join, or a node combination of meta-data source.

11. The computer-implemented method of claim 1, wherein an edge connects one or more nodes and represents the movement of data between nodes, or meta-data.

12. The computer-implemented method of claim 11, wherein edge meta-data represents the direction, ordinality, or cardinality of movement of data between nodes.

13. The computer-implemented method of claim 1, wherein the rules and actions are stored in a memory resident rules registry.

* * * * *